United States Patent [19]
Castro

[11] Patent Number: 5,329,610
[45] Date of Patent: Jul. 12, 1994

[54] NEURAL NETWORK EMPLOYING ABSOLUTE VALUE CALCULATING SYNAPSE

[75] Inventor: Hernan A. Castro, Shingle Springs, Calif.

[73] Assignee: Intel Corporation, Santa Clara, Calif.

[21] Appl. No.: 884,807

[22] Filed: May 19, 1992

[51] Int. Cl.$^5$ .......................................... G06F 15/18
[52] U.S. Cl. ...................................... 395/24; 395/22; 395/23
[58] Field of Search ................................ 395/22, 23, 24

[56] References Cited

U.S. PATENT DOCUMENTS

| | | | |
|---|---|---|---|
| 4,956,564 | 9/1990 | Holler et al. | 307/201 |
| 4,961,002 | 10/1990 | Tam et al. | 307/201 |
| 5,040,230 | 8/1991 | Takatori et al. | 395/22 |
| 5,083,285 | 1/1992 | Shima et al. | 395/24 |
| 5,115,492 | 5/1992 | Engeler | 395/24 |
| 5,120,996 | 6/1992 | Mead et al. | 395/24 |
| 5,146,602 | 9/1992 | Holler et al. | 395/23 |
| 5,167,008 | 11/1992 | Engeler | 395/24 |

*Primary Examiner*—Michael R. Fleming
*Assistant Examiner*—Tariq R. Hafiz

[57] ABSTRACT

A neural network employing absolute difference calculating synapse cells comprising a pair of floating gate devices coupled in parallel between an internal cell node and column line of the network. The network further includes a switched-capacitor circuit for summing all of the charges generated by all of the synapse cells within a column of the network. The circuit operates in response to a sequence of applied voltage pulses such that each cell generates a charge representing either the input, the weight, or the minimum/maximum of either the weight or the input. The accumulation of these charges represents the sum of the absolute value difference between the input voltages and the stored weights for a single column of the array.

15 Claims, 2 Drawing Sheets

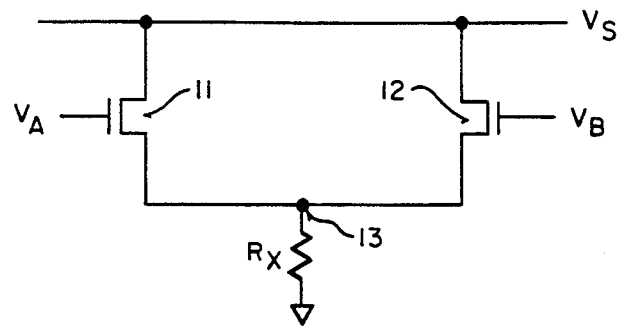
FIG_1
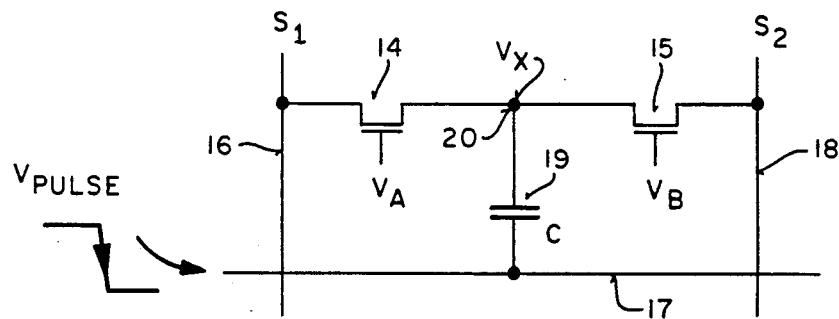
FIG_2
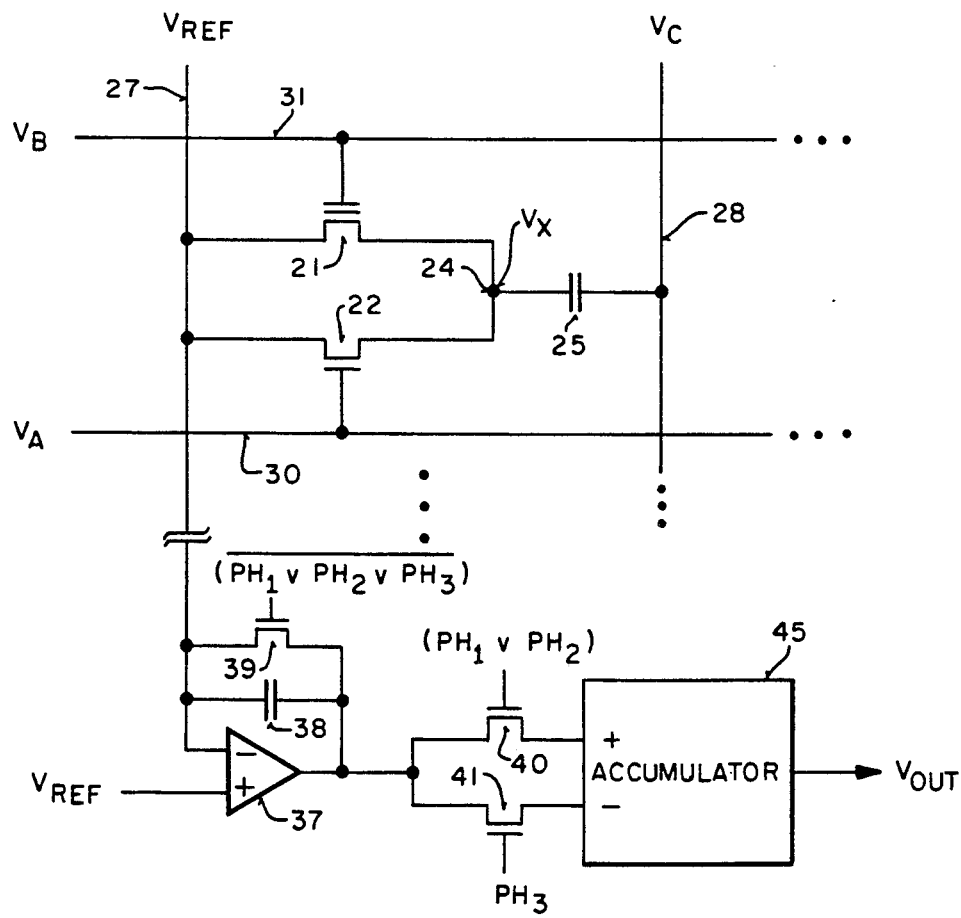
FIG_3

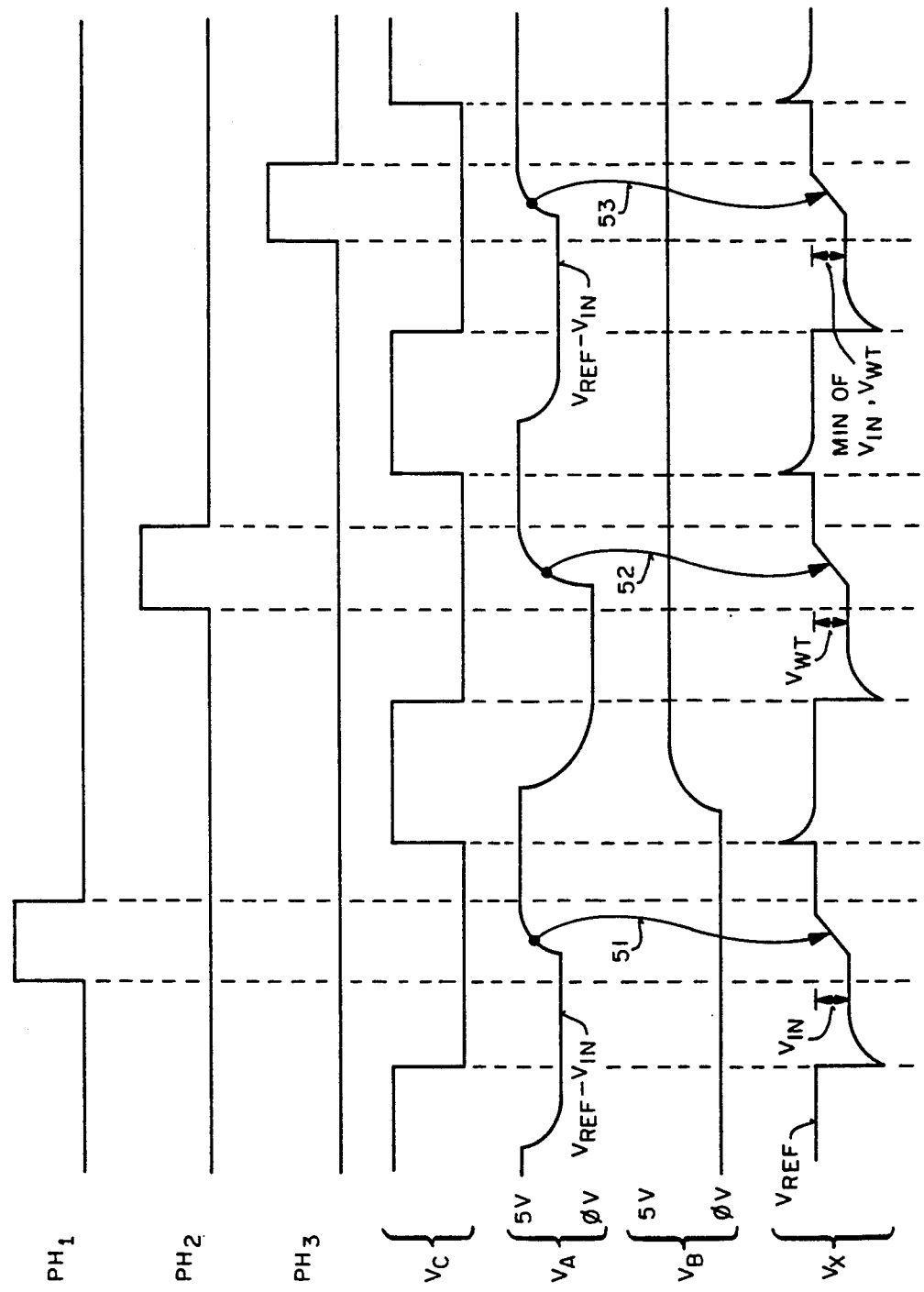

NEURAL NETWORK EMPLOYING ABSOLUTE VALUE CALCULATING SYNAPSE

FIELD OF THE INVENTION

The present invention is related to the field of artificial neural networks; more specifically, to circuits and methods for electrically implementing such networks utilizing floating gate devices.

BACKGROUND OF THE INVENTION

Artificial neural networks generally consist of multiple layers of neuron devices which provide massively parallel computing power. An interesting feature of such networks is their adaptive capabilities which allow the network to learn new information. These characteristics provide parallel processing of information at high computational rates—far exceeding the performance of conventional von Neumann computers which execute a program of instructions sequentially.

Neural networks generally take the form of a matrix of connections which simulate the function of a biological nervous system. Typically, electrical circuits are employed to provide variable strength synaptic connections between a plurality of inputs and a number of summing elements (i.e., neurons). The strength of the interconnections is commonly referred as the "weight" of the network. The synaptic weight, which frequently changes during the training or learning process, basically modulates the amount of charge or voltage input into each neuron within the network.

In the past, electrical synapse cells which employ floating gate devices have been used for storing connection weights in the form of electrical charge. In a floating gate device, current flow is modulated in a way which depends upon the value of the stored electrical charge. In these cells, a dot product calculation is normally performed wherein an applied input voltage is multiplied by the stored weight to produce an output. This output is then summed with other synaptic outputs in the network. Examples of semiconductor synapse cells which employ floating gate devices for storing weights are found in U.S. Pat. Nos. 4,956,564 and 4,961,002.

Another category of neural network computes the euclidean distance between the input value and stored weight value. This type of network calculates what is frequently referred to as a "city block" difference calculation. A city block difference calculation is performed by taking the absolute difference between an applied input and the stored weight of the cell. As in the case of synapse cells which calculate dot products, the output of a distance calculating synapse is usually summed with other similar outputs within the network. Both the multiplying and difference calculating types of neural networks are equally capable of solving computational tasks such as associative memory and pattern classification.

As will be seen, the present invention discloses a novel neural network architecture for parallel calculation of the absolute "city block" difference between an input voltage and a stored weight vector. The invented network utilizes switched-capacitor circuitry and floating gate devices for emulating the function of a biological synapse.

SUMMARY OF THE INVENTION

A neural network employing absolute difference calculating synapse cells is described. In one embodiment, the synapse cells comprise a pair of floating gate devices coupled in parallel between an internal cell node and column line within the network. The column line is coupled to a reference potential and the internal node is coupled to a capacitor. The other terminal of the capacitor is coupled to a means for providing voltage pulses having both positive-going and negative-going transitions. One of the field-effect devices has its gate coupled to the row line in the network which provides the input. The other field effect device has a floating gate member for storing the synaptic weight in the form of an electrical charge.

The network further includes a means for summing all of the charges generated by all of the synapse cells within a column of the network. The summing means operates in response to a sequence of applied voltage pulses such that each cell generates a charge representing either the input, the weight, or the minimum/maximum of either the weight or the input. In response to this sequence of voltage pulses, the summing means outputs a value which represents the sum of the absolute value difference between the input voltages and the stored weights for a single column of the array. The network performs parallel calculation of this sum of differences in a number of distinct phases.

BRIEF DESCRIPTION OF THE DRAWINGS

The present invention will be understood more fully from the detailed description which follows and form the accompanying drawings, which, however, should not be taken to limit the invention to the specific embodiments shown but are for explanation and understanding only.

FIG. 1 is a circuit schematic diagram of a follower device which outputs the maximum of one of a pair of input voltages.

FIG. 2 is a circuit schematic of the basic synapse cell employed within the neural network of the present invention.

FIG. 3 illustrates the basic architecture of the neural network of the present invention.

FIG. 4 is a timing diagram showing the basic operation of the neural network of FIG. 3.

DETAILED DESCRIPTION

A neural network employing absolute difference calculating synapse cells is described. In the following description, numerous specific details are set forth, such as specific voltages, conductivity types, timing relationships, etc., in order to provide a thorough understanding of the present invention. It will be obvious, however, to one skilled in the art that these specific details may not be needed to practice the present invention. In other instances, well-known structures and circuits have not been shown or explained in particular detail in order to avoid unnecessarily obscuring the present invention.

FIG. 1 illustrates a simple source follower device which includes field-effect devices 11 and 12 coupled in parallel between an operating supply potential $V_S$ and an intermediate node 13. A resistor $R_X$ is coupled between node 13 and ground. Field-effect devices 11 and 12 are shown being driven by gate voltages $V_A$ and $V_B$.

It is helpful to analyse the circuit of FIG. 1 in order to better understand the operation of the present invention. First, assume that the intrinsic threshold of devices 11 and 12 is zero, and that resistor and supply values are such that follower operation is obtained. Temporarily ignoring the effect of device 12, notice that whenever voltage $V_A$ appears at the gate of device 11, that same voltage $V_A$ is driven onto the common source node 13. In other words, node 13 of the circuit of FIG. 1 follows the input voltage $V_A$ under normal conditions. In actuality, the source voltage of device 11 would be equal to $V_A - V_{TH}$, where $V_{TH}$ is the voltage threshold of device 11. However, in the above example, we have assumed that the voltage threshold of device 11 is zero in order to simplify the analysis.

Device 12 operates in an analogous manner to that of device 11. That is, ignoring the effect of device 11, when $V_B$ is applied to the gate of device 12, that voltage is coupled to internal node 13.

Now consider what happens when both $V_A$ and $V_B$ are applied to their respective devices in FIG. 1. In this case, whichever device has the larger applied gate potential will override the other one. In other words, node 13 will assume the larger of the two input voltage values.

By way of example, if $V_B$ is greater than $V_A$, then device 12 will drive the common source node 13 to the voltage $V_B$. This higher voltage functions to shut off the other device—in this case device 11. The opposite condition occurs when $V_A$ is greater than $V_B$. That is, device 11 drives node 13 to the voltage $V_A$ and device 12 turns off. So, in effect, the follower device of FIG. 1 couples the higher of the two voltages, $V_A$ or $V_B$, to the internal node 13.

Another way of looking at the same phenomenon is that the circuit of FIG. 1 calculates the minimum difference between either the voltage $V_A$ or $V_B$ and the supply potential $V_S$. In other words, if $V_B$ is greater than $V_A$, then the difference $V_S$ minus $V_B$ will be less than the difference $V_S$ minus $V_A$. So, depending on your perspective, the circuit of FIG. 1 calculates either a maximum or a minimum of two quantities.

As will become apparent shortly, the calculating nature of the follower device of FIG. 1 is utilized in the present invention (in a modified form) for the purpose of calculating the absolute difference between two quantities. In the difference calculating neural network of the present invention, each synapse cell within the array calculates the absolute difference between an input voltage and a stored weight. This absolute value difference can be expressed mathematically either as a function of the maximum difference between the input and the weight, or as the minimum difference between the two with respect to a reference potential. This is shown by the equations below where the absolute value difference between two quantities, A and B, is expressed by two alternative equations.

$$|A - B| = (A + B) - 2 \min(A, B)$$

$$|A - B| = 2 \max(A, B) - (A + B)$$

Thus, one of the key features of the present invention is that it utilizes either one of the above relationships to calculate the difference between two quantities as a function of either the minimum or maximum value of an input and a weight.

FIG. 2 illustrates a charge domain synapse cell useful in performing the minimum/maximum calculations described above. The synapse cell of FIG. 2 includes a capacitor 19 coupled between an input row line 17 and an internal node 20. Normally, row line 17 is coupled to all of the synapse cells within a single row of the array. Node 20 is commonly coupled to field-effect devices 14 and 15, which in turn, are coupled to summing lines 16 and 18, respectively. Summing lines 16 and 18 (also labelled as $S_1$ and $S_2$ respectively) are usually distributed vertically throughout the array and are coupled to each of the synapse cells located within a single column of the network.

The circuit of FIG. 2 shows devices 14 and 15 comprising ordinary n-channel MOS devices. However, the voltages $V_A$ or $V_B$ could just as easily be established by means of a floating gate potential. In the more usual circumstance, the voltage $V_A$ is applied as an analog input voltage while the voltage $V_B$ is set by means of a floating potential. (A general discussion of the operation of charge domain synapse cells, such as the type shown in FIG. 2, is found in co-pending patent application entitled "Charge Domain Synapse Cell," Ser. No. 07/747,640, filed Aug. 21, 1991, which application is assigned to the assignee of the present invention.)

If one assumes that the voltages $V_{S1}$ and $V_{S2}$ applied to respective lines 16 and 18 are equal, then whenever a negative-going voltage transition (e.g., $V_{PULSE}$) appears on input line 17, the voltage $V_X$ on node 20 will be coupled down. In other words, capacitor 19 couples the instantaneous voltage change on line 17 to internal node 20.

After node 20 drops in response to a negative-going transition on line 17, it begins to recharge through one or both of transistors 14 and 15. The voltage $V_X$, however, only recharges to a level which represents the maximum of either $V_A$ or $V_B$ (assuming, of course, that both $V_A$ and $V_B$ are less than $V_{S1} = V_{S2}$). Another way of looking at the response of the synapse cell of FIG. 2 is that the voltage $V_X$ recharges to the minimum voltage difference as calculated between the applied input gate voltages and the reference voltage provided on lines 16 and 18. Hence, the circuit of FIG. 2 calculates the minimum (or maximum) of the applied input voltages $V_A$ and $V_B$.

Once the voltage $V_X$ has been allowed to recharge, the quantity of charge stored on node 20 can now be transferred out of the synapse cell to either of summing lines 16 or 18. In the currently preferred embodiment, this occurs during a separate cycle of operation, as described below.

FIG. 3 illustrates a portion of a neural network comprising an array of synapse cells, wherein each synapse cell includes a floating gate device 21 coupled in parallel to an ordinary n-channel field-effect device 22. Both devices are coupled between a column summing line 27 and an internal node 24. Line 27 represents the two summing lines $S_1$ and $S_2$ shown previously in FIG. 2. Both of these summing lines are shown merged in the circuit of FIG. 3 due to the fact that each is commonly coupled to the reference potential $V_{REF}$.

Node 24 is coupled to line 28 through capacitor 25. Line 28 provides a sequence of voltage pulses and is coupled to each of the synapse cells distributed along a single column of the array. The same is true of column summing line 27 which provides potential $V_{REF}$ to devices 21 and 22 for each cell in the column. It is appreciated that in certain applications, line 27 may be separated into two separate lines—one coupled to device 21 and the other coupled to device 22—in order to accommodate hot electron updating. Such a modification is considered well within the spirit and scope of the present invention.

The inputs to the synapse cells in the network of FIG. 3 are provided along lines 30 and 31 coupled to the gates of devices 22 and 21, respectively. Each of lines 30 and 31 are coupled to all of the synapse cell distributed along a single row of the array.

In accordance with the principles described above, the synapse cells in the neural network of FIG. 3 calculate the maximum of either the input voltage $V_A$ or the potential stored in the floating gate of device 21 in response to a transition appearing on line 28. By proper adjustment of voltages $V_A$ and $V_B$, the absolute value difference calculation described by the above equations can be performed using the circuit of FIG. 3 by means of a sequence of pulse cycles. This aspect of the present invention will now be described in further detail below.

FIG. 3 also shows a switched capacitor network coupled to column summing line 27. The switched capacitor network comprises an operational amplifier having its positive input coupled to a reference voltage (e.g., $V_{REF}$) and its negative input coupled to line 27. Practitioners in the art will appreciate that amplifier 37 is configured as an integrator, with capacitor 38 being coupled from the negative input to the output of amplifier 37. Coupled in parallel with capacitor 38 is switching transistor 39. The gate of transistor 39 is coupled to receive various clock phases associated with the sequence of voltage pulses applied to the network for the purpose of calculating the absolute difference quantity.

The output of amplifier 37 is also coupled to switching transistors 40 and 41. For instance, transistor 40 is coupled between the output of amplifier 37 and the positive input of accumulator 45, whereas transistor 41 is coupled between the output of amplifier 37 and the negative input of accumulator 45. The output of accumulator 45 is a voltage $V_{OUT}$ which represents the absolute difference between an applied input and a stored weight for a given column of the array.

As can be seen, the gate of transistor 40 receives clock signals from either the first or second clock phases, while transistor 41 has its gate coupled to receive clock signals from a third clock phase. The relationship of the various clock phases to the operation of the present invention will be discussed shortly.

The present invention can be better understood by considering the neural network architecture of FIG. 3 in conjunction with the timing waveform diagrams shown in FIG. 4. FIG. 4 illustrates the response of the presently invented neural network to a sequence of applied input voltages. The sequence of applied inputs to the network includes three separate clock phase signals: phase 1 ($PH_1$), phase 2 ($PH_2$) and phase 3 ($PH_3$). Each of these clock pulses play an important role in the absolute value difference calculation.

Consider the response of the network of FIG. 3 to each of the clock phase signals. Prior to the first positive-going transition of clock signal $PH_1$, the pulsed control voltage $V_C$ coupled to line 28 is high. Just before the control signal $V_C$ transitions low, a voltage input is applied along line 30. In the current embodiment, the voltage $V_A$ is taken to a voltage level equal to $V_{REF}$ minus $V_{IN}$, where $V_{IN}$ represents the applied input to the network. This input voltage is allowed to stabilize prior to the first negative-going transition of signal $V_C$.

During this first phase of operation, the voltage coupled to the control gate of device 21 along line 31 is grounded. This is accomplished by taking the voltage $V_B$ to zero volts, thereby removing the effect of this input from the first summation performed in the sequence of calculations.

Upon the arrival of the first negative-going transition of the voltage $V_C$, the internal voltage $V_X$ at node 24 transitions low due to the voltage coupling nature of capacitor 25. However, as described in conjunction with the operation of the cell of FIG. 2, the voltage $V_X$ immediately recharges to a potential equal to the difference between the voltage on line 27 and the applied input on line 30. Because the applied voltage on line 30 is equal to $V_{REF}$ minus $V_{IN}$, the internal node voltage $V_X$ simply recharges to a voltage $V_{IN}$ with respect to the operating potential $V_{REF}$.

Thus, as part of the first phase or cycle of operation, the neural network of FIG. 3 produces a quantity of charge at internal node 24 which is proportional to the input voltage $V_{IN}$. This charge represents the first term required as part of the absolute value difference calculation (see above equations).

During the time that the first phase signal $PH_1$ is active, the quantity of charge generated at node 24 is integrated with all the other charges produced at this internal node for all of the synapse cells located within the same column of the array. In this context, observe that whenever clock signals $PH_1$, $PH_2$ and $PH_3$ are low, transistor 39 is turned on. This effectively disables the integrating function of amplifier 37 by discharging capacitor 38.

On the other hand, when $PH_1$ transitions high (ignoring the effect of $PH_2$ and $PH_3$ for the time being) transistor 39 is turned off. This enables amplifier 37 and capacitor 38 to once again integrate the charge generated at each of the internal synapse nodes 24 before the positive-going transition of clock signal $PH_1$ arrives. At this point, the charge at node 24 can be transferred to line 27 by raising wordline 30 (coupled to the gate of device 22) to a high positive potential. The response of the voltage $V_X$ to this transition of the input voltage $V_A$ is shown in FIG. 4 by arrow 51. Note that the voltage $V_X$ recharges to the reference potential $V_{REF}$ as the charge transfer process takes place.

Recognize that while the clock signal $PH_1$ is high, transistor 40 is also turned on such that the total column charge (representing the sum of the $V_{IN}$ terms) is accumulated as a positive input to accumulator 45. When clock signal $PH_1$ transitions low, the first phase of the calculating sequence has been complete.

During the second phase of operation, a second term from the absolute value difference equation is calculated. In the case of the currently preferred embodiment, this second term comprises the sum of the stored weights for a column of synapse cells in the array. To calculate this sum, the input voltage $V_A$ is grounded during the time that the control voltage $V_C$ is high. Meanwhile, the input voltage $V_B$ (coupled to the control gate of transistor 21) is taken to a reference potential so that the threshold of device 21 represents the stored weight. Recall that the stored weight is represented by the presence of an electrical charge on the floating gate of device 21.

With the arrival of the second negative-going transition of the voltage control pulse $V_C$, the synaptic node voltage $V_X$ drops low. It then immediately recharges to a voltage level proportional to the stored weight value.

This level is depicted in FIG. 4 by the voltage $V_{WT}$. The corresponding charge stored at internal node 24 is then transferred out of each of the synapse cells as described above. In other words, during the time that the clock signal PH$_2$ is high, the wordline voltage $V_A$ on row line 30 is raised to a positive potential high enough to cause the stored charge at node 24 to be transferred to summing line 27. As before, this charge packet is integrated with all the other charge packets produced by the other cells in the same column of the array. The response of the node voltage $V_X$ to the change in the input $V_A$ is indicated in FIG. 4 by arrow 52. Note that during the time that the clock signal PH$_2$ is high, amplifier 37 and capacitor 38 function as an integrator (i.e., transistor 39 is off). This permits capacitor 38 to accumulate the charge packets of all of the associated cells. At the same time, transistor 40 is turned on thereby allowing the sum of all the weights in the column to be accumulated as a positive term within accumulator 45. In other words, the charge built up on capacitor 38 is transferred to accummulator 45 before capacitor 38 is discharged to begin the third phase of operation.

The third phase of operation is used to calculate the final term in the absolute value difference calculation: the minimum of either the input voltage $V_{IN}$ or the stored weight $V_{WT}$ is determined. To perform this calculation, the voltage $V_A$ is again taken to a voltage equal to $V_{REF}$ minus $V_{IN}$ while the control voltage $V_C$ is high. Unlike the first phase of operation, however, the voltage $V_B$ remains at a high reference potential during the third phase. This means that the threshold voltage of device 21 is now directly proportional to the stored weight present on the floating gate member.

Upon the arrival of the third negative-going transition of $V_C$, internal node voltage $V_X$ once again transitions low and then recharges to the minimum of either $V_{IN}$ or $V_{WT}$. This is shown occurring just prior to the arrival of the third clock signal PH$_3$. When PH$_3$ transitions high, the voltage $V_A$ is again taken to a high positive potential so that the charge generated at internal node 24 can be transferred to capacitor 38 along line 27. Note that while the clock signal PH$_3$ is high, transistor 39 is turned-off and transistor 41 is turned-on. This couples the output of amplifier 37 to the negative input of accumulator 45. The charge transfer process occurrs in response to the change in the voltage $V_A$, as indicated in FIG. 4 by arrow 53.

Because the absolute value difference calculation requires a term equal to twice the minimum of either $V_N$ or $V_{WT}$, the calculation performed during the third phase of operation can be repeated in a fourth phase, if desired. Alternatively, accumulator 45 can include a 2X multiplication factor at its negative input terminal. In this latter case the multiplication takes place automatically during the third phase of operation. Either way, the final result produced by accumulator 45 represents the sum of the absolute value difference between the input voltages and the stored weights for a single column of the neural network array.

To summarize, the absolute value calculation is carried out in at least three separate phases of operation. In the currently preferred embodiment, the first phase of operation calculates the sum of the applied input voltages. The charge generated during the first phase of operation is stored in accumulator 45; capacitor 38 is discharged, and then the second phase of operation begins. During the second phase, the sum of the stored weights are similarly accumulated and added to the sum of the input voltages. Finaly, the third calculation which determines the minimum of either the applied input of the stored weight is performed during the last phase (or last two phases) of operation. This minimum term gets subtracted from the previously accumulated sum to arrive at the final result.

Although the present invention has been described in conjunction with certain embodiments, it is appreciated that the invention may be implemented in a variety of ways. Consequently, it is to be understood that the particular embodiments shown and described by way of illustration are no way intended to be limiting. Reference to the details of these embodiments is not intended to limit the scope of the claims which themselves recite only those features regarded as essential to the invention.

What is claimed is:

1. A neural network for calculating the absolute difference between an input and a stored weight comprising:

means for generating a sequence of voltage pulses including first, second and third voltage pulses;

an array of synapse cells arranged in rows and columns, said cells being coupled to said generating means, each cell generating a predetermined sequence of charges in response to said sequence of voltage pulses, said sequence including a first charge representing said input, a second charge representing said weight, and a third charge representing the lesser potential of either said weight or said input, said first, second, and third charges being generated in response to said first, second, and third voltage pulses respectively;

a plurality of summing devices coupled to said synapse cells, each device summing said first, second, and third charges generated by a plurality of synapse cells arranged along a single column of said array, the sum of said first charges being calculated in response to said first voltage pulse, the sum of said second charges being calculated in response to said second voltage pulse, and the sum of said third charges being calculated in response to said third voltage pulse;

a plurality of accumulators, each of which is coupled to a corresponding one of said summing devices, each accumulator adding said sum of said first charges to said sum of said second charges, and subtracting said sum of said third charges therefrom, to produce an output voltage representing the absolute value difference between said input and said weight for said single column.

2. The neural network of claim 1 wherein said synapse cells each comprise a pair of field-effect devices coupled in parallel between an internal node and a column line, said column line being coupled to a reference potential and said internal node being coupled to said voltage pulse generating means through a capacitor, one of said field-effect devices having its gate coupled to a row line providing said input and the other said field-effect devices having a floating gate member for storing said weight.

3. The neural network of claim 2 wherein said first, second, and third charges are generated at said internal node in response to a negative transition of said first, second, and third voltage pulses respectively.

4. The neural network of claim 3 wherein said summing devices each comprise an operational amplifier configured as an integrator with said column line being coupled to one input of said amplifier.

5. The neural network of claim 4 wherein said sequence of voltage pulses further comprises a fourth pulse, each said cell generating a fourth charge equal in magnitude to said third charge in response to said fourth pulse.

6. A neural network comprising:
an array of synapse cells arranged in rows and columns, each cell comprising first and second field-effect devices having source nodes that are commonly coupled to an internal node and drain nodes that are coupled to a reference potential, each of said cells further comprising a capacitor coupled to said internal node, and wherein said second field-effect device comprises a floating gate device having a threshold corresponding to a synaptic weight;
a plurality of control pulse lines, each control pulse line coupling a pulse stream comprising voltage transitions to said capacitor of each of the cells in the same column of said array;
a plurality of column summing lines, each column summing line being coupled to all of the cells in the same column through the drain nodes of said field-effect devices;
a plurality of row lines, pairs of said row lines being coupled to all of the cells in the same row wherein one of a pair of row lines selectively couples an input voltage to the gate of said first field-effect device and the other of said pair selectively couples a high positive potential to the control gate of said second field-effect device;
said network further comprising a means coupled to said column summing lines for integrating charges developed thereon by said synapse cell,
said charges being developed on said column summing lines in response to first, second, and third voltage transitions of said pulse stream wherein said first voltage transition produces a first charge proportional to said input voltage, said second voltage transition produces a second charge proportional to said weight, and said third voltage transition produces a third charge which is proportional to the difference between said reference potential and either said weight or said input voltage.

7. The neural network of claim 6 further comprising a means for accumulating said charges integrated by said integrating means.

8. The neural network of claim 7 wherein said accumulating means adds the sum of the first charges to the sum of the second charges, and subtracts twice the sum of the third charges therefrom, to produce an output voltage representing the absolute difference between said input voltage and said synaptic weight.

9. The neural network of claim 8 wherein said integrating means comprises a switched capacitor circuit.

10. The neural network of claim 9 further comprising a clocking means for providing clock signals to said integrator and accumulating means, predetermined ones of said clock signals being active during the time between a negative transition and the next positive transition of said pulse stream.

11. A neural network for calculating the absolute difference between an input and a stored weight comprising:
means for generating a sequence of voltage pulses including first, second and third voltage pulses;
an array of synapse cells arranged in rows and columns, said cells being coupled to said generating means, each cell generating a predetermined sequence of charges in response to said sequence of voltage pulses, said sequence including a first charge representing said input, a second charge representing said weight, and a third charge representing the larger potential of either said weight or said input, said first, second, and third charges being generated in response to said first, second, and third voltage pulses, respectively;
a plurality of summing devices coupled to said synapse cells, each device summing said first, second, and third charges generated by a plurality of synapse cells arranged along a single column of said array, the sum of said first charges being calculated in response to said first voltage pulse, the sum of said second charges being calculated in response to said second voltage pulse, and the sum of said third charges being calculated in response to said third voltage pulse;
a plurality of accumulators, each of which is coupled to a corresponding one of said summing devices, each accumulator adding said sum of said first charges to said sum of said second charges, and subtracting said sum of said third charges therefrom, to produce an output voltage representing the absolute value difference between said input and said weight for said single column.

12. The neural network of claim 11 wherein said synapse cells each comprise a pair of field-effect devices coupled in parallel between an internal node and a column line, said column line being coupled to a reference potential and said internal node being coupled to said voltage pulse generating means through a capacitor, one of said field-effect devices having its gate coupled to a row line providing said input and the other said field-effect devices having a floating gate member for storing said weight.

13. The neural network of claim 12 wherein said first, second, and third charges are generated at said internal node in response to a negative transition of said first, second, and third voltage pulses, respectively.

14. The neural network of claim 13 wherein said summing devices each comprise an operational amplifier configured as an integrator with said column line being coupled to one input of said amplifier.

15. The neural network of claim 14 wherein said sequence of said voltage pulses further including a fourth pulse which generates a fourth charge equal in magnitude to said third charge.

* * * * *